(12) United States Patent
Yamashita et al.

(10) Patent No.: US 11,220,954 B2
(45) Date of Patent: Jan. 11, 2022

(54) SUPERCHARGING SYSTEM WITH A MODEL ANALYSIS UNIT

(71) Applicant: MITSUBISHI HEAVY INDUSTRIES, LTD., Tokyo (JP)

(72) Inventors: Yukio Yamashita, Tokyo (JP); Takuya Koyanagi, Tokyo (JP); Vissuta Jiwariyavej, Tokyo (JP); Ayumi Naito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/640,558

(22) PCT Filed: May 23, 2019

(86) PCT No.: PCT/JP2019/020389
§ 371 (c)(1),
(2) Date: Feb. 20, 2020

(87) PCT Pub. No.: WO2019/225677
PCT Pub. Date: Nov. 28, 2019

(65) Prior Publication Data
US 2020/0217242 A1    Jul. 9, 2020

(30) Foreign Application Priority Data

May 25, 2018 (JP) .............................. JP2018-100507

(51) Int. Cl.
*F02B 37/04* (2006.01)
*F01D 15/10* (2006.01)
(Continued)

(52) U.S. Cl.
CPC .............. *F02B 37/04* (2013.01); *F01D 15/10* (2013.01); *F01N 5/04* (2013.01); *F02B 37/004* (2013.01);
(Continued)

(58) Field of Classification Search
CPC ..... F02B 37/00–24; F02B 39/10; Y02T 10/12
See application file for complete search history.

(56) References Cited

U.S. PATENT DOCUMENTS

| 7,541,687 B2 * | 6/2009 | Stahlhut | B60W 10/26 290/52 |
| 2008/0032842 A1 * | 2/2008 | Johnson | F02D 29/04 475/5 |

(Continued)

FOREIGN PATENT DOCUMENTS

| CN | 105229275 A | 1/2016 |
| CN | 106059401 A | 10/2016 |

(Continued)

OTHER PUBLICATIONS

International Search Report dated Jul. 30, 2019 in corresponding International (PCT) Patent Application No. PCT/JP2019/020389, with English Translation.

(Continued)

*Primary Examiner* — Laert Dounis
(74) *Attorney, Agent, or Firm* — Wenderoth, Lind & Ponack, L.L.P.

(57) ABSTRACT

An object is to provide a supercharging system capable of actively and easily controlling a rotational speed of a turbine generator. A supercharging system includes a compressor driven by an electric motor to pump fluid to an engine, a turbine generator rotated by exhaust from the engine, and a drive device that drives the electric motor by electricity generated by the turbine generator, wherein the drive device includes a rectifying unit that rectifies the electricity generated by the turbine generator, a converter unit that steps up or down a voltage value of a DC voltage rectified by the rectifying unit and outputs the DC voltage, an inverter unit that drives the electric motor using the DC voltage output (Continued)

from the converter unit, and a control unit that controls a change amount of the DC voltage in the converter unit.

18 Claims, 8 Drawing Sheets

(51) Int. Cl.
*F01N 5/04* (2006.01)
*F02B 37/14* (2006.01)
*F02B 41/10* (2006.01)
*F02B 39/10* (2006.01)
*F02B 37/00* (2006.01)
*F02B 37/013* (2006.01)
*F02D 41/00* (2006.01)
*F02B 37/12* (2006.01)

(52) U.S. Cl.
CPC ............ *F02B 37/013* (2013.01); *F02B 37/14* (2013.01); *F02B 39/10* (2013.01); *F02B 41/10* (2013.01); *F02D 41/0007* (2013.01); *F02B 2037/122* (2013.01); *Y02T 10/12* (2013.01)

(56) References Cited

U.S. PATENT DOCUMENTS

| | | |
|---|---|---|
| 2010/0018203 A1 | 1/2010 | Richards |
| 2013/0098034 A1 | 4/2013 | Niizuma |
| 2013/0134918 A1* | 5/2013 | Richards .................. F01N 5/04 318/490 |
| 2014/0346865 A1* | 11/2014 | Akashi .................... B60L 58/10 307/10.7 |
| 2016/0024961 A1 | 1/2016 | Richards |
| 2016/0265422 A1 | 9/2016 | Yamashita et al. |
| 2019/0257234 A1* | 8/2019 | Sasaki ................... B60W 10/26 |

FOREIGN PATENT DOCUMENTS

| | | | |
|---|---|---|---|
| CN | 106979066 A * | 7/2017 | |
| FR | 2989117 A1 * | 10/2013 | ......... F02D 41/0007 |
| GB | 2444603 | 6/2008 | |
| JP | 06-341325 | 12/1994 | |
| JP | 09-032567 | 2/1997 | |
| JP | 09-032569 | 2/1997 | |
| JP | 2000-179348 | 6/2000 | |
| JP | 5700237 | 4/2015 | |
| JP | 2015-108330 | 6/2015 | |
| JP | 2016-512295 | 4/2016 | |
| JP | 2018-150838 | 9/2018 | |
| KR | 101347355 B1 * | 1/2014 | |
| WO | WO-2017154149 A1 * | 9/2017 | ............ F02B 37/013 |
| WO | 2018/084309 A1 | 5/2018 | |

OTHER PUBLICATIONS

Written Opinion of the International Searching Authority dated Jul. 30, 2019 in corresponding International (PCT) Patent Application No. PCT/JP2019/020389, with English Translation.
Office Action dated Jun. 3, 2021 in corresponding Chinese Patent Application No. 201980004056.5, with partial translation, 10 pages.

* cited by examiner

SUPERCHARGING SYSTEM WITH A MODEL ANALYSIS UNIT

TECHNICAL FIELD

The present invention relates to a supercharging system.

BACKGROUND ART

In internal combustion engines (engines) mounted on automobiles and the like, for high output and high efficiency, a configuration is devised in which a compressor is provided on an intake side of an internal combustion engine and a turbine generator is provided on an exhaust side of the internal combustion engine (for example, PTL 1). Electricity regenerated by the turbine generator is used to drive the compressor.

CITATION LIST

Patent Literature

[PTL 1]
The Publication of Japanese Patent No. 5700237

SUMMARY OF INVENTION

Technical Problem

In the configuration described in PTL 1, the turbine generator passively rotates and generates electricity by exhaust from the internal combustion engine, and the generated electricity is used to drive the compressor. That is, an operating state (rotational speed or the like) of the turbine generator is passively determined. However, since efficiency of the turbine generator depends on, for example, peripheral velocity, when the operating state of the turbine generator is passively determined (not controlled), the turbine generator may operate at an inefficient operation point. That is, it has not been able to actively make the turbine generator in an efficient operating state.

The present invention has been made in view of such circumstances, and an object is to provide a supercharging system capable of actively and easily controlling a rotational speed of a turbine generator.

Solution to Problem

A first aspect of the present invention is a supercharging system that includes a compressor driven by an electric motor to pump fluid to an internal combustion engine, a turbine generator rotated by exhaust from the internal combustion engine, and a drive device that drives the electric motor by electricity generated by the turbine generator, wherein the drive device includes a rectifying unit that rectifies the electricity generated by the turbine generator, a converter unit that steps up or down a voltage value of a DC voltage rectified by the rectifying unit and outputs the DC voltage, an inverter unit that drives the electric motor using the DC voltage output from the converter unit, and a control unit that controls a change amount of the DC voltage in the converter unit.

According to the configuration as described above, after rectifying the electricity generated by the turbine generator, the voltage value of the rectified DC voltage is stepped up or down and thereby the change amount of the voltage value is controlled. Since a load (braking force) on the turbine generator can be changed by changing (stepping up or down) the electricity generated by the turbine generator, it becomes possible to control a rotational speed of the turbine generator. For example, when the generated electricity is stepped up, an amount of conducting current increases, so the load increases and the rotational speed of the turbine generator decreases. When the generated electricity is stepped down, the amount of conducting current decreases, so the load decreases and the rotational speed of the turbine generator increases. That is, by changing the generated electricity, the rotational speed of the turbine generator can be actively and easily controlled. For example, it is possible to control the turbine generator to a rotational speed or the like at which the turbine generator is efficient. The converter unit that steps up or down the voltage value of the DC voltage and outputs the DC voltage is a DC/DC converter and is a step-up converter, a step-down converter, or a step-up/down converter.

Since the DC voltage is stepped up or down on an upstream side of the inverter unit that drives the electric motor, it is possible to control the rotational speed of the turbine generator regardless of control and operating states of the electric motor and internal combustion engine.

Since the change amount of the DC voltage in the converter unit is controlled, it is possible to control, with a simple configuration, the rotational speed of the turbine generator without using a complicated control system like, for example, vector control.

In the above-described supercharging system, the drive device may include a power storage unit that stores the DC voltage output from the converter unit.

According to the configuration as described above, since the DC voltage output from the converter unit is stored, even if the voltage value of the DC voltage is changed in the converter unit, the change can be buffered.

In the above-described supercharging system, the control unit may include a target value setting unit that sets a target rotational speed of the turbine generator and a voltage change amount control unit that controls the change amount of the DC voltage in the converter unit so that a present rotational speed of the turbine generator matches the target rotational speed.

According to the configuration as described above, since the change amount of the DC voltage in the converter unit is controlled so that the present rotational speed of the turbine generator matches the target rotational speed, it is possible to easily control the rotational speed of the turbine generator with a simple configuration of a control system.

In the above-described supercharging system, the control unit may include a target value setting unit that sets a target value of a state quantity indicating an operating state of the supercharging system as a target state quantity, a model analysis unit that uses a predetermined evaluation function including a difference between a state quantity of the supercharging system and the target state quantity as a variable, and calculates an optimal state quantity of the supercharging system at which a solution to the evaluation function is substantially minimized after a predetermined time has elapsed based on an analysis model of the supercharging system, and a voltage change amount control unit that controls the change amount of the DC voltage in the converter unit based on the optimal state quantity calculated by the model analysis unit.

According to the configuration as described above, since a function including a difference between the state quantity of the supercharging system and the target state quantity as a variable is set as evaluation function and the optimal state quantity of the supercharging system at which a solution of the evaluation function is substantially minimized after the predetermined time has elapsed is calculated, it is possible to calculate the optimal state quantity of the supercharging system in the future. Since the change amount of the DC voltage in the converter unit is controlled based on the optimal state quantity, it is possible to efficiently set the supercharging system to the optimal operating state in advance. That is, even if the operating state of the supercharging system is transitional, it is possible to optimize the operating state more effectively. The state quantity indicating the operating state of the supercharging system is, for example, the rotational speed of the turbine generator or pressure of a manifold.

In the above-described supercharging system, the target value setting unit may set a target rotational speed of the turbine generator as the target state quantity, and the model analysis unit may include a difference between the rotational speed of the turbine generator and the target rotational speed as the variable in the evaluation function.

According to the configuration as described above, since the evaluation function includes the difference between the rotational speed of the turbine generator and the target rotational speed as the variable, it is possible to set the evaluation function using an easily obtainable parameter (rotational speed).

In the above-described supercharging system, the target value setting unit may set the target rotational speed at which a peripheral velocity ratio which is a ratio of an outer peripheral velocity of a turbine to a flow velocity of fluid flowing into the turbine in the turbine generator reaches a predetermined value.

According to the configuration as described above, since the target rotational speed at which the peripheral velocity ratio reaches the predetermined value in the turbine generator is set, it is possible to cause the turbine generator to operate at a desired peripheral velocity ratio. For example, since the efficiency of the turbine generator depends on the peripheral velocity ratio, by appropriately setting the peripheral velocity ratio, it is possible to maintain the turbine generator in a more efficient operating state. Specifically, the efficiency of the turbine generator is maximized when the peripheral velocity ratio is in the vicinity of 0.7. The peripheral velocity ratio is a ratio of an outer peripheral velocity of the turbine (peripheral velocity at outer peripheral portions of turbine blades) to a flow velocity of fluid flowing into the turbine.

In the above-described supercharging system, the target value setting unit may set the target rotational speed at which the peripheral velocity ratio reaches the predetermined value based on an inlet temperature of the exhaust in the turbine generator and a pressure ratio of the exhaust in the turbine generator.

According to the configuration as described above, the target rotational speed at which the peripheral velocity ratio reaches the predetermined value is set using the inlet temperature and pressure ratio of the exhaust in the turbine generator. Since the peripheral velocity ratio in the turbine generator largely depends on the inlet temperature and pressure ratio of the exhaust in the turbine generator, it varies depending on the operating state of the turbine generator. Therefore, by taking the inlet temperature and pressure ratio of the exhaust in the turbine generator into consideration, the operating state of the turbine generator can be appropriately identified, and the target rotational speed at which the peripheral velocity ratio reaches the predetermined value can be set more accurately.

In the above-described supercharging system, the target value setting unit may have a relationship among the inlet temperature of the exhaust in the turbine generator, the pressure ratio of the exhaust in the turbine generator, and the rotational speed at which efficiency is substantially maximized in the turbine generator, identify a rotational speed at which efficiency is substantially maximized from the inlet temperature and the pressure ratio at present of the turbine generator based on the relationship, and set the identified rotational speed as the target rotational speed.

According to the configuration as described above, by using the relationship among the inlet temperature and pressure ratio of the exhaust in the turbine generator and the rotational speed at which efficiency is substantially maximized in the turbine generator, it is possible to easily acquire the rotational speed at which efficiency is substantially maximized from the inlet temperature and the pressure ratio at present of the turbine generator. That is, it is possible to set the target rotational speed more simply.

Since a peripheral velocity ratio (for example, 0.7) at which the efficiency of the turbine generator becomes better is not necessarily constant, by directly acquiring the rotational speed at which efficiency is substantially maximized from the inlet temperature and pressure ratio of the exhaust in the turbine generator, it is possible to make the turbine generator in a highly efficient state more accurately. The relationship among the inlet temperature and pressure ratio of the exhaust in the turbine generator and the rotational speed at which efficiency is substantially maximized in the turbine generator is set in advance by a preliminary test, analysis, or the like.

In the above-described supercharging system, the target value setting unit may have a relationship between an operating state of the internal combustion engine and the rotational speed at which efficiency is substantially maximized in the turbine generator, identify a rotational speed at which efficiency is substantially maximized from a present operating state of the internal combustion engine based on the relationship, and set the identified rotational speed as the target rotational speed.

According to the configuration as described above, by using the relationship between the operating state of the internal combustion engine and the rotational speed at which efficiency is substantially maximized in the turbine generator, it is possible to easily acquire the rotational speed at which efficiency is substantially maximized.

In the above-described supercharging system, the operating state may be a rotational speed and a load state of the internal combustion engine.

According to the configuration as described above, since the rotational speed and load state of the internal combustion engine are used as the operating state, it is possible to efficiently identify the operating state of the internal combustion engine.

Advantageous Effects of Invention

According to the present invention, an effect that the rotational speed of a turbine generator can be actively and easily controlled is achieved.

DESCRIPTION OF EMBODIMENTS

First Embodiment

Hereinafter, a first embodiment of a supercharging system according to the present invention will be described with reference to the drawings.

Figure 1:
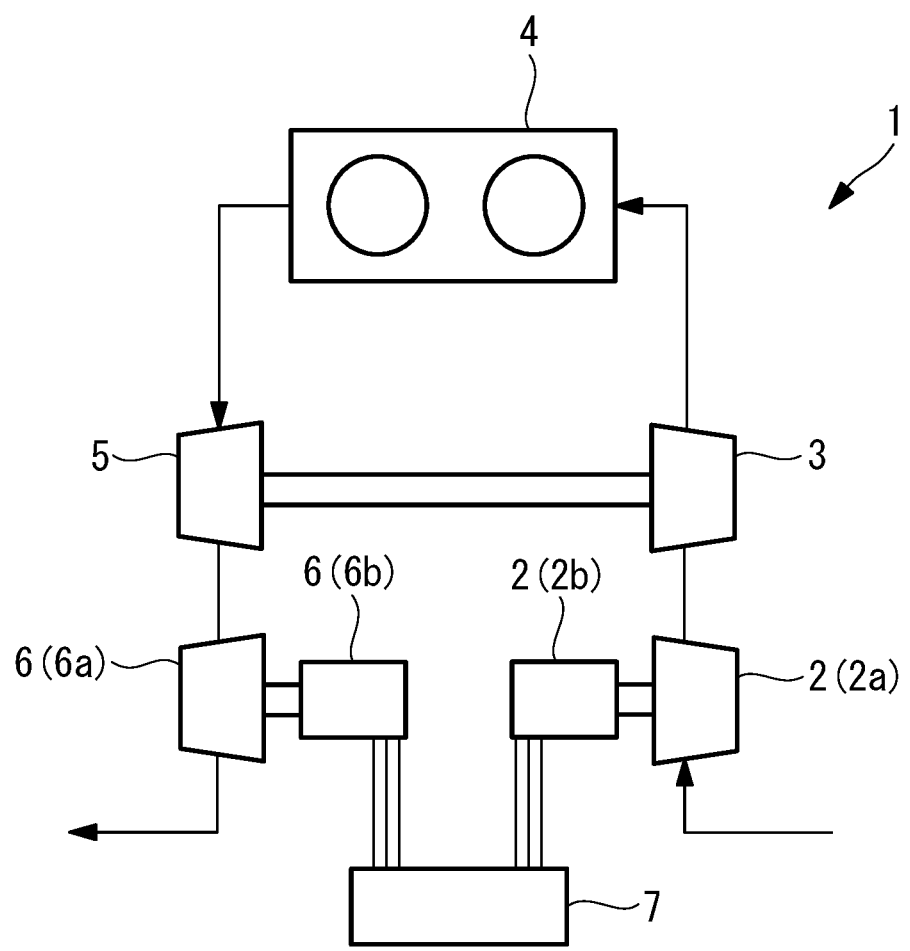
FIG. 1 is a diagram showing a schematic configuration of a supercharging system according to a first embodiment of the present invention.

FIG. 1 is a diagram showing a schematic configuration of a supercharging system 1 according to the first embodiment of the present invention. As shown in FIG. 1, the supercharging system 1 according to the embodiment is provided in an internal combustion engine (hereinafter referred to as "engine 4") and includes a low pressure side electric compressor (hereinafter referred to as "low pressure compressor 2"), a high pressure side compressor (hereinafter referred to as "high pressure compressor 3"), an exhaust turbine 5, a turbine generator 6, and a drive device 7 as main components. In the supercharging system 1, fluid flows through in the order of the low pressure compressor 2, high pressure compressor 3, engine 4, exhaust turbine 5, and turbine generator 6, and in the embodiment, a case of using air as the fluid will be described. Instead of air, other fluid may be used. In the embodiment, a case will be described where the supercharging system 1 is applied to an automobile, but it is possible to apply the supercharging system 1 to an object as long as the object requires the engine 4 without being limited to an automobile.

The low pressure compressor 2 is an electric compressor driven by an electric motor 2b, takes in and compresses air (outside air), and pumps high-pressure air to the engine 4. For this reason, the low pressure compressor 2 includes a compressor 2a and the electric motor 2b, which are connected to each other with a common shaft. The electric motor 2b is controlled by the drive device 7 described later.

The high pressure compressor 3 is a compressor driven by energy of exhaust collected by the exhaust turbine 5 and is connected to the exhaust turbine 5 with a common shaft. The exhaust from the engine 4 causes the exhaust turbine 5 to rotate, rotational force of the exhaust turbine 5 is transmitted to the high pressure compressor 3 via the common shaft, and thereby the high pressure compressor 3 is driven. The high pressure compressor 3 further compresses the air compressed by the low pressure compressor 2 into a higher pressure state and supplies to the engine 4.

The engine 4 uses the high-pressure air pumped by the low pressure compressor 2 and high pressure compressor 3 to internally burn fuel and thereby converts thermal energy into mechanical energy (rotational force). Then, the engine 4 uses the extracted mechanical energy, for example, to drive wheels of an automobile, and drives the automobile. Burned air is supplied to the exhaust turbine 5 as exhaust.

The exhaust turbine 5 converts the energy held by the exhaust supplied from the engine 4 into rotational force and drives the high pressure compressor 3 via the common shaft.

The turbine generator 6 regenerates the energy from the exhaust discharged from the engine 4 to generate electricity. For this reason, the turbine generator 6 includes a turbine 6a and a generator 6b, which are connected to each other with a common shaft. The exhaust discharged from the engine 4 flows into the turbine 6a and works on turbine blades to generate rotational force. The generated rotational force is transmitted to the generator 6b via the common axis, and inside the generator 6b, causes magnets to rotate and coils to generate electromagnetic induction, and thereby generates an AC voltage. In this way, the turbine generator 6 generates a three-phase AC voltage. The exhaust that has finished work in the turbine generator 6 is discharged into the outside of the supercharging system 1 (into outside air).

A load on the generator 6b varies depending on magnitude of a conduction current (state of a load resistance value) on a power output side of the generator 6b. For example, when the conduction current increases, the load on the generator 6b increases, braking force of the generator 6b increases, and the generator 6b decelerates (a rotational speed Nt of the turbine 6a also decreases). When the conduction current decreases, the load on the generator 6b decreases, the braking force of the generator 6b decreases, and the generator 6b accelerates (the rotational speed Nt of the turbine 6a also increases). The electricity generated by the turbine generator 6 is supplied to the drive device 7 and used for driving the low pressure compressor 2.

Figure 2:
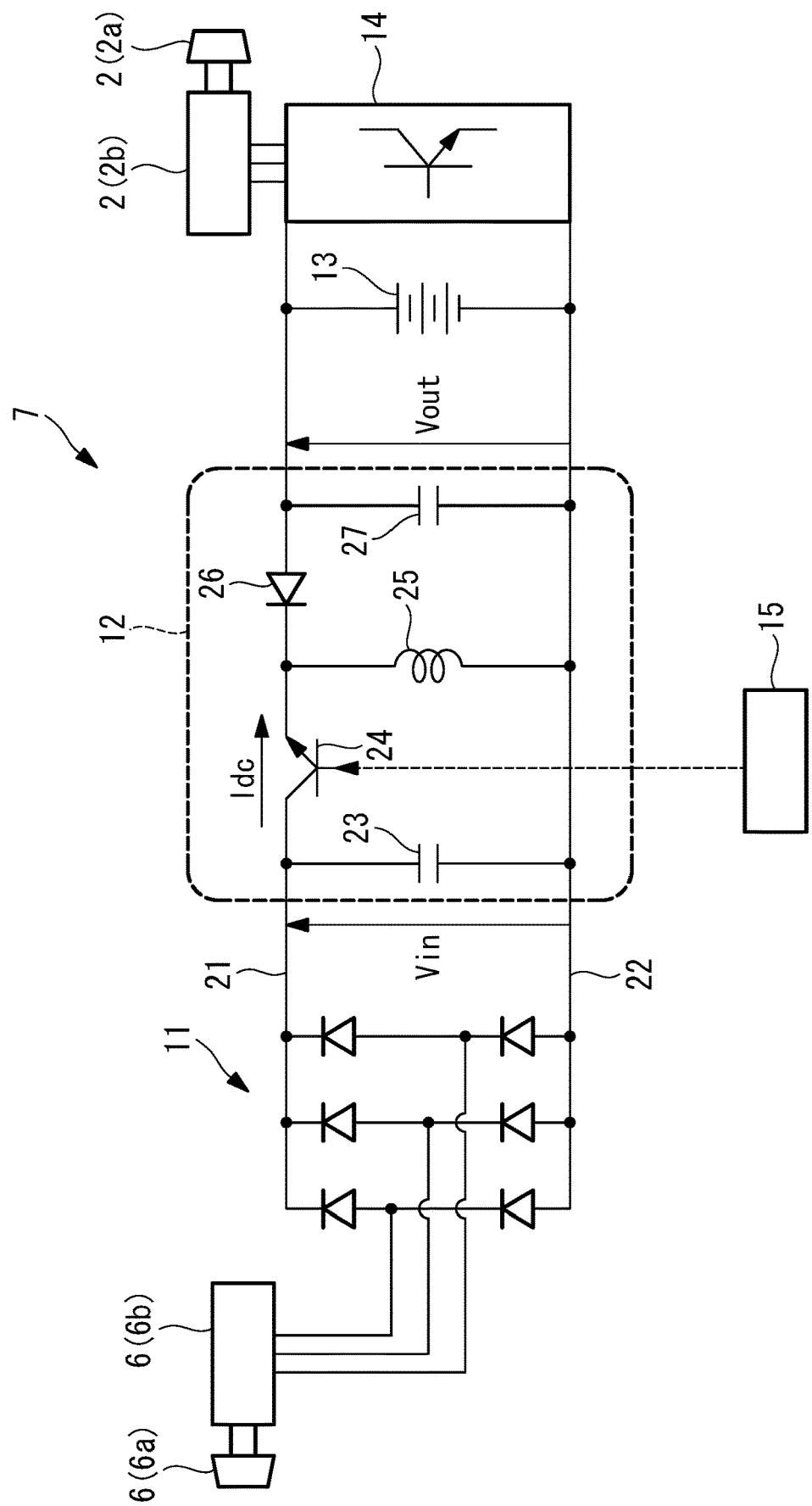
FIG. 2 is a diagram showing a schematic configuration of a drive device according to the first embodiment of the present invention.

The drive device 7 drives the electric motor 2b of the low pressure compressor 2 by the electricity generated by the turbine generator 6. The drive device 7 changes a load state (conduction current amount) of the turbine generator 6 and thereby controls the rotational speed Nt of the turbine generator 6 (rotational speed Nt of the turbine 6a). FIG. 2 is a diagram showing a schematic configuration of the drive device 7. As shown in FIG. 2, the drive device 7 includes a rectifying unit 11, a converter unit 12, a power storage unit 13, an inverter unit 14, and a control unit 15. The rectifying unit 11, converter unit 12, power storage unit 13, and inverter unit 14 are formed by hardware as an electric circuit. The power storage unit 13 may be made unnecessary.

The rectifying unit 11 rectifies the three-phase AC generated by the turbine generator 6. Specifically, the rectifying unit 11 is provided with two (total 6) diode elements corresponding to each phase of the three-phase AC generated by the turbine generator 6, and performs full-wave rectification of the three-phase AC. DC voltage (input voltage Vin) produced by rectification is output to the converter unit 12. Although in the embodiment, the rectifying unit 11 performs full-wave rectification, it is also possible to perform half-wave rectification and the like as long as rectification is performed without being limited to full-wave rectification.

The converter unit 12 steps up or down a voltage value of the DC voltage rectified by the rectifying unit 11 and outputs the DC voltage. Specifically, the converter unit 12 is a DC/DC converter (step-up/down chopper) capable of stepping up/down and steps up or down a voltage input into the converter unit 12 (hereinafter referred to as "input voltage Vin"). A change amount of step-up/down between the input voltage Vin and a voltage output from the converter unit 12

(hereinafter referred to as "output voltage Vout") is controlled by the control unit 15 described later.

For example, as shown in FIG. 2, referring to an output side electric circuit of the rectifying unit 11 as a DC line (positive pole side DC electric circuit) and a ground line (ground side DC electric circuit), the converter unit 12 includes, from the rectifying unit 11 side, a capacitor 23 connected to the DC line 21 and ground line 22, a switching element 24 (for example, a transistor, an FET, or an IGBT) provided on the DC line 21, an inductor 25 connected to the DC line 21 and ground line 22, a backflow prevention element 26 (diode) provided on the DC line 21, and a capacitor 27 connected to the DC line 21 and ground line 22.

The converter unit 12 changes the change amount of the output voltage Vout with respect to the input voltage Vin (for example, a step-up/down ratio=output voltage Vout/input voltage Vin) according to a duty ratio D of the switching element 24 (ratio of a period when the switching element 24 is in the conduction state with respect to a unit control cycle). For example, if the duty ratio D is 0.5 or more, the input voltage Vin is stepped up (output voltage Vout>input voltage Vin), and if the duty ratio D is less than 0.5, the input voltage Vin is stepped down (output voltage Vout<input voltage Vin).

That is, the converter unit 12 controls the duty ratio D of the switching element 24 and adjusts the change amount of step-up/down of the input voltage Vin, thereby changes the load state of the generator 6b, and controls the rotational speed Nt of the turbine generator 6. Specifically, when the duty ratio D is set to 0.5 or more to step up, a conduction current flowing to the power storage unit 13 and inverter unit 14 described later increases, the load on the generator 6b increases (braking force increases), and the generator 6b decelerates (the rotational speed Nt of the turbine 6a also decreases). When the duty ratio D is set to less than 0.5 to step down, the conduction current decreases, the load on the generator 6b decreases (braking force decreases), and the generator 6b accelerates (the rotational speed Nt of the turbine 6a also increases). The duty ratio D for controlling the switching element 24 is controlled by the control unit 15 described later so that the rotational speed Nt of the turbine generator 6 reaches a target rotational speed Nt*.

Although in the embodiment, the converter unit 12 is a step-up/down converter having the configuration as shown in FIG. 2, it is also possible to use a step-up/down converter having another circuit configuration. The converter unit 12 may be a step-up converter or a step-down converter.

The power storage unit 13 (battery) stores the DC voltage output from the converter unit 12. Specifically, the power storage unit 13 is connected between the DC line 21 and ground line 22 on the output side of the converter unit 12 and stores power according to a voltage difference of the DC line 21 from the ground line 22 (output voltage Vout).

The inverter unit 14 drives the electric motor 2b by using the DC voltage output from the converter unit 12. Specifically, the inverter unit 14 is, for example, a three-phase bridge inverter circuit including six switching elements (for example, transistors, FETs, or IGBTs), performs switching control of each of the switching elements, and thereby converts the output voltage Vout of the converter unit 12 into a three-phase AC voltage of a desired cycle to supply the electric motor 2b. The switching elements in the inverter unit 14 are PWM controlled so that the rotational speed of the electric motor 2b matches a desired rotational speed (target rotational speed of the electric motor 2b set so that a requested capability can be output in the low pressure compressor 2).

The control unit 15 controls a change amount of the DC voltage in the converter unit 12. That is, by controlling the change amount of the DC voltage, the control unit 15 changes braking force generated in the turbine generator 6 and controls the rotational speed Nt of the turbine generator 6.

The control unit 15 includes, for example, a CPU (Central Processing Unit), a memory such as a RAM (Random Access Memory), and a computer-readable recording medium, which are not shown. A series of processing steps for implementing various functions described later are recorded in the recording medium or the like in the form of a program, the CPU reads the program into the RAM or the like, executes information processing and arithmetic processing, and thereby implements the various functions described later. Various forms may be applied to the program, for example, the program may be installed in the ROM or another storage medium in advance, provided in a state of being stored in the computer-readable storage medium, or distributed via a communication means by cable or radio. The computer-readable storage medium is a magnetic disk, a magneto-optical disk, a CD-ROM, a DVD-ROM, a semiconductor memory, or the like.

Figure 3:
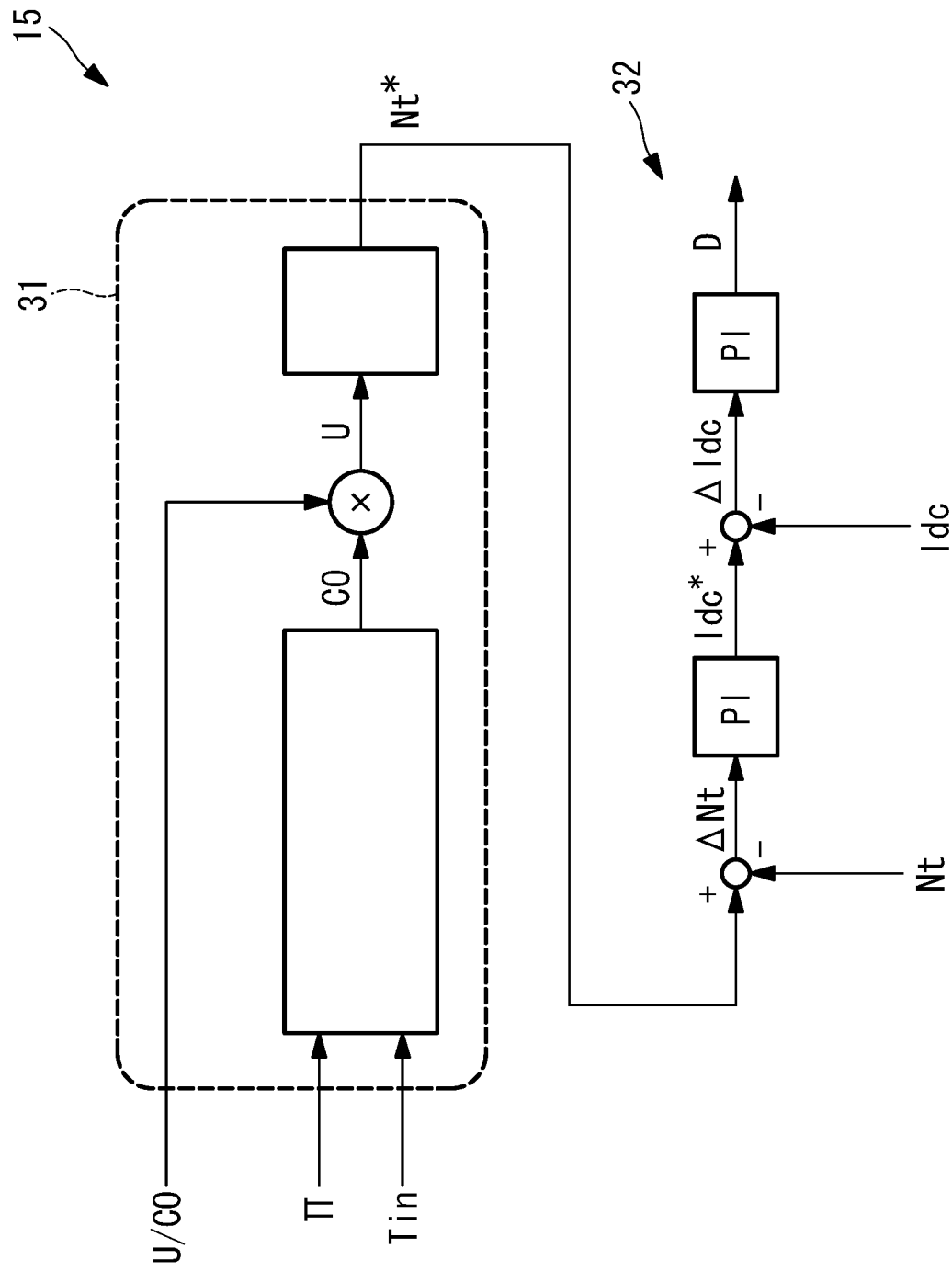
FIG. 3 is a control block diagram of a control unit according to the first embodiment of the present invention.

FIG. 3 is a control block diagram of the control unit 15. As shown in FIG. 3, the control unit 15 includes a target value setting unit 31 and a voltage change amount control unit 32.

The supercharging system 1 is provided with various measuring instruments for measuring information required by the control unit 15. Specifically, a temperature measuring instrument (not shown) that measures an inlet temperature Tin of the exhaust (hereinafter simply referred to as "inlet temperature Tin") in the turbine generator 6 is provided at an exhaust flow inlet of the turbine 6a. The inlet temperature Tin of the exhaust in the turbine generator 6 is a temperature of the exhaust when the exhaust output from the engine 4 flows into the turbine 6a in the turbine generator 6. In order to measure a pressure ratio Π of the exhaust in the turbine generator 6 (hereinafter simply referred to as "pressure ratio Π"), pressure measuring instruments (not shown) are each provided at the exhaust flow inlet and an exhaust flow outlet of the turbine 6a. The pressure ratio Π of the exhaust in the turbine generator 6 is a ratio between a pressure of the exhaust when the exhaust output from the engine 4 flows into the turbine 6a in the turbine generator 6 and a pressure of the exhaust when flowing out from the turbine 6a. A rotational speed measuring instrument (not shown) that measures the rotational speed Nt of the turbine generator 6 (rotational speed Nt of the turbine 6a) is provided for the turbine generator 6. A current measuring instrument (not shown) that measures a DC conduction current (hereinafter simply referred to as "DC current Idc") flowing through the switching element 24 in the converter unit 12 is provided in the converter unit 12. Measurement results of the temperature measuring instrument, pressure measuring instruments, rotational speed measuring instrument, and current measuring instrument are output to the control unit 15.

The target value setting unit 31 sets the target rotational speed Nt* of the turbine generator 6. Specifically, the target value setting unit 31 sets the target rotational speed Nt* at which a peripheral velocity ratio U/C0 reaches a predetermined value in the turbine generator 6 on the basis of the inlet temperature Tin of the exhaust in the turbine generator 6 and the pressure ratio Π of the exhaust in the turbine generator 6. The target value setting unit 31 acquires the inlet temperature Tin from the temperature measuring instrument provided at the exhaust flow inlet of the turbine 6a and acquires the pressure ratio Π of the exhaust in the turbine generator 6 from the pressure measuring instruments provided at the exhaust flow inlet and exhaust flow outlet of the turbine 6a.

The peripheral velocity ratio U/CO is a parameter having a correlation with efficiency of the turbine generator 6 (particularly, the turbine 6a) and is a parameter represented by a ratio between a peripheral velocity at outer peripheral portions of turbine blades (hereinafter referred to as "outer peripheral velocity U") and a flow velocity of the exhaust flowing into the turbine 6a (hereinafter simply referred to as "flow velocity CO"). The outer peripheral velocity U and flow velocity CO are represented by the following formulas (1) and (2), respectively.

[Expression 1]

$$U = \frac{N_t}{60} \times D_t \times \pi \quad (1)$$

$$CO = \sqrt{2 C_p T_{in}\left(1 - \Pi^{\frac{\kappa-1}{\kappa}}\right)} \quad (2)$$

In the above formula (1), Dt denotes an outer diameter (diameter) of the turbine blades. In the above formula (2), Cp denotes a constant pressure heat capacity of the turbine 6a and κ denotes a specific heat ratio. The efficiency of the turbine 6a is maximized when the peripheral velocity ratio U/CO reaches a certain optimal value (for example, 0.7), and when the turbine 6a is operated at a peripheral velocity ratio U/CO deviating from the optimal value, the efficiency substantially drops. That is, it is possible to operate the turbine 6a at high efficiency by controlling the operating state of the turbine generator 6 so as to make the peripheral velocity ratio U/CO the optimal value.

However, since the inlet temperature Tin of the turbine 6a and the pressure ratio Π of the turbine 6a in the formula (2) vary depending on the operating state of the engine 4 or the like, the flow velocity CO momentarily varies. Therefore, the target value setting unit 31 acquires measurement values of the inlet temperature Tin and pressure ratio Π of the turbine 6a, identifies a flow velocity CO of the turbine 6a at present from the formula (2), and calculates the rotational speed Nt of the turbine generator 6 that makes the peripheral velocity ratio U/CO a certain optimal value on the basis of the formula (1).

Specifically, as shown in FIG. 3, the target value setting unit 31 first acquires a preset optimal value (target value) of the peripheral velocity ratio U/CO and measurement values of the inlet temperature Tin and pressure ratio Π of the turbine 6a, and calculates a flow velocity CO on the basis of the formula (2). Then, by multiplying the optimal value of the peripheral velocity ratio (U/CO) and the calculated flow velocity CO together, the target value setting unit 31 calculates an outer peripheral velocity U of the turbine 6a for making the peripheral velocity ratio (U/CO) the optimal value. Then, by using the formula (1) from the calculated outer peripheral speed U (that is, by multiplying the outer peripheral velocity U by 60/(Dt·π)), the target value setting unit 31 calculates the rotational speed Nt of the turbine generator 6 and sets the calculated rotational speed Nt as the target rotational speed Nt*.

By the above processing, the target value setting unit 31 can set the rotational speed Nt of the turbine generator 6 at which the peripheral velocity ratio U/CO reaches the optimal value at the flow velocity CO at present as the target rotational speed Nt*. The target rotational speed Nt* calculated by the target value setting unit 31 is output to the voltage change amount control unit 32.

The voltage change amount control unit 32 controls a change amount of the DC voltage (input voltage Vin) in the converter unit 12 so that the present rotational speed Nt of the turbine generator 6 matches the target rotational speed Nt*. For the control in the voltage change amount control unit 32, feedback control for the rotational speed Nt of the turbine 6a is applied.

Specifically, as shown in FIG. 3, the voltage change amount control unit 32 acquires the target rotational speed Nt* set by the target value setting unit 31 and acquires the measurement value of the present rotational speed Nt of the turbine 6a, and calculates a difference ΔNt. Then, in order to make the rotational speed Nt of the turbine 6a match the target rotational speed Nt*, the voltage change amount control unit 32 calculates a target value of the DC current Idc (target DC current Idc*) that makes the calculated difference ΔNt zero. For the control for calculating the target DC current Idc*, for example, IP control based on the difference ΔNt (deviation) between the present rotational speed Nt of the turbine 6a and the target rotational speed Nt* is applied.

Then, the voltage change amount control unit 32 acquires a present DC current Idc (measurement value) from the current measuring instrument, calculates the difference ΔIdc between the present DC current Idc (measurement value) and target DC current Idc*, and calculates a duty ratio D of the switching element 24 at which the difference ΔIdc becomes zero in order to make the DC current Idc in the converter unit 12 match the target DC current Idc*. For control for calculating the duty ratio D, for example, IP control based on the difference ΔIdc (deviation) between the present DC current Idc and target DC current Idc* is applied. A switching control signal of the calculated duty ratio D is input into a control terminal (gate) of the switching element 24 in the converter unit 12, and on/off of the switching element 24 is controlled according to the duty ratio D.

By controlling the switching element 24 on the basis of the calculated duty ratio D, the DC current Idc flowing through the switching element 24 can be made the target DC current Idc*. That is, by setting the load state of the generator 6b to an appropriate state, the rotational speed Nt of the turbine 6a can be made the target rotational speed Nt*.

The supercharging system 1 according to the embodiment may further include a cooling device (for example, an intercooler) or the like that cools high-temperature high-pressure air output from the low pressure compressor 2 and high-temperature high-pressure air output from the high pressure compressor 3. Since the air discharged from the low pressure compressor 2 or high pressure compressor 3 is decreased in density, the cooling device is provided to cool the air and increase density, thereby oxygen can be supplied to the engine 4 as a larger mass flow rate, and the efficiency of the engine 4 can be increased.

Although in the embodiment, the configuration (two-stage configuration) is adopted in which the low pressure compressor 2 and high pressure compressor 3 are provided on an upstream side (supercharging side) of airflow from the engine 4 (two-stage configuration), and the exhaust turbine 5 and turbine generator 6 are provided on a downstream side (exhaust side) of the airflow from the engine 4, various configurations can be designed as appropriate as long as the configurations include at least one compressor (electric compressor) on the supercharging side and at least the turbine generator 6 on the exhaust side.

As described above, the supercharging system according to the embodiment rectifies electricity generated by the turbine generator 6, then steps up or down a voltage value of the rectified DC voltage, and controls a change amount of the voltage value. Since a load (braking force) on the turbine generator 6 can be changed by changing (stepping up or down) the electricity generated by the turbine generator 6, it becomes possible to control the rotational speed Nt of the turbine generator 6. For example, when the generated electricity is stepped up, an amount of conducting current increases, thereby the load increases, and the rotational speed Nt of the turbine generator 6 decreases. When the generated electricity is stepped down, the amount of conducting current decreases, thereby the load decreases, and the rotational speed Nt of the turbine generator 6 increases. That is, by changing the generated electricity, it is possible to actively and easily control the rotational speed Nt of the turbine generator 6. For example, it is possible to control to a rotational speed Nt or the like at which the turbine generator 6 is efficient.

Since the DC voltage is stepped up or down on an upstream side of the inverter unit 14 that drives the electric motor 2b, it is possible to control the rotational speed Nt of the turbine generator 6 regardless of the control and operating states of the electric motor 2b and engine 4.

Since the change amount of the DC voltage in the converter unit 12 is controlled, it is possible to control, with a simple configuration, the rotational speed Nt of the turbine generator 6 without using a complicated control system like, for example, vector control. Since the DC voltage output from the converter unit 12 is stored, it is possible to buffer a change even if the voltage value of the DC voltage is changed in the converter unit 12.

Since the target rotational speed Nt* at which the peripheral velocity ratio U/CO becomes the predetermined value in the turbine generator 6 is set, it is possible to operate the turbine generator 6 at the desired peripheral velocity ratio U/CO. For example, since the efficiency of the turbine generator 6 depends on the peripheral velocity ratio U/CO, it is possible to maintain the turbine generator 6 in a more efficient operating state by appropriately setting the peripheral velocity ratio U/CO. By using the inlet temperature Tin and pressure ratio Π of the exhaust in the turbine generator 6, the target rotational speed Nt* at which the peripheral velocity ratio U/CO becomes the predetermined value is set. Since the peripheral velocity ratio U/CO in the turbine generator 6 largely depends on the inlet temperature Tin and pressure ratio Π of the exhaust in the turbine generator 6, it varies by the operating state of the turbine generator 6. Therefore, by taking the inlet temperature Tin and pressure ratio Π of the exhaust in the turbine generator 6 into consideration, it is possible to appropriately identify the operating state of the turbine generator 6, and more accurately set the target rotational speed Nt* at which the peripheral velocity ratio U/CO becomes the predetermined value.

Second Embodiment

Next, a supercharging system according to a second embodiment of the present invention will be described.

In the above-described first embodiment, the target value setting unit 31 sets the target rotational speed Nt* at which the peripheral velocity ratio U/CO in the turbine generator 6 becomes the predetermined value. However, the peripheral velocity ratio at which the efficiency of the turbine generator 6 is maximized may not necessarily be constant. Therefore, in the embodiment, the peripheral velocity ratio is not limited to a constant value, and a rotational speed Nt at which efficiency of a turbine generator 6 is substantially maximized is set as a target rotational speed Nt*. Hereinafter, a supercharging system 1 according to the embodiment will be described focusing on differences from the first embodiment.

Figure 4:
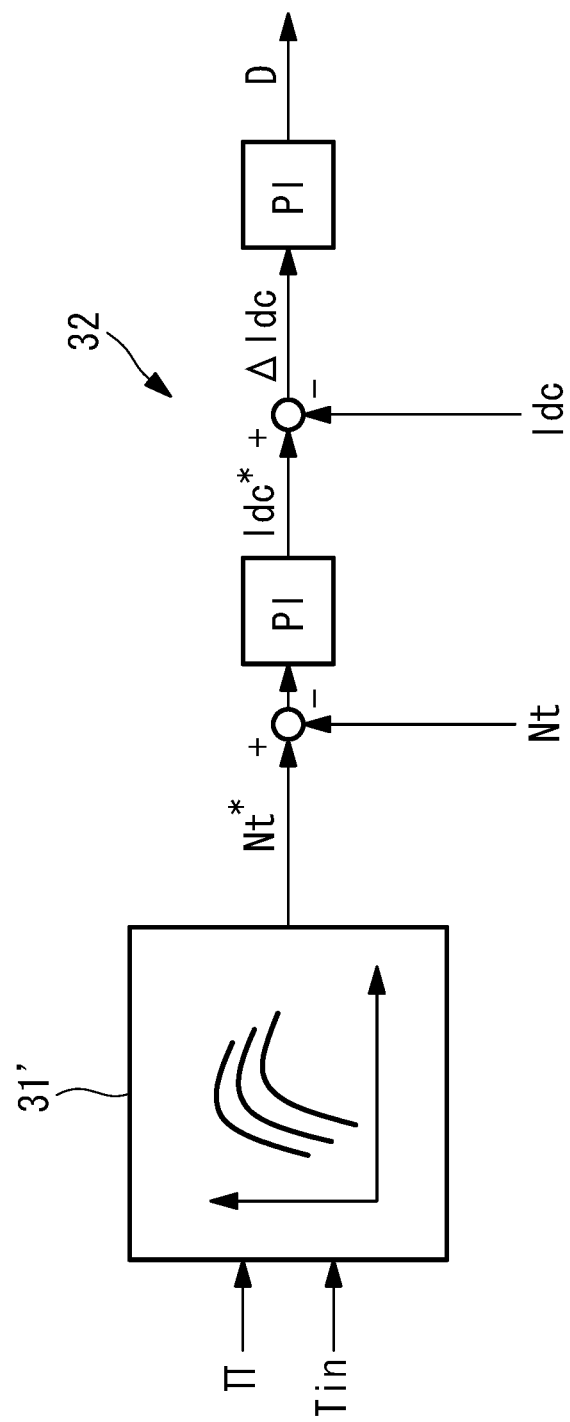
FIG. 4 is a control block diagram of a control unit according to a second embodiment of the present invention.

FIG. 4 is a control block diagram of a control unit 15 according to the embodiment. A target value setting unit 31' in the embodiment has a relationship among an inlet temperature Tin of exhaust in the turbine generator 6 and a pressure ratio Π of the exhaust in the turbine generator 6, and a rotational speed Nt at which efficiency is substantially maximized in the turbine generator 6, identifies a rotational speed Nt at which efficiency is substantially maximized from a present inlet temperature Tin and pressure ratio Π of the turbine generator 6 on the basis of the relationship, and sets the identified rotational speed Nt as the target rotational speed Nt*.

Figure 5:
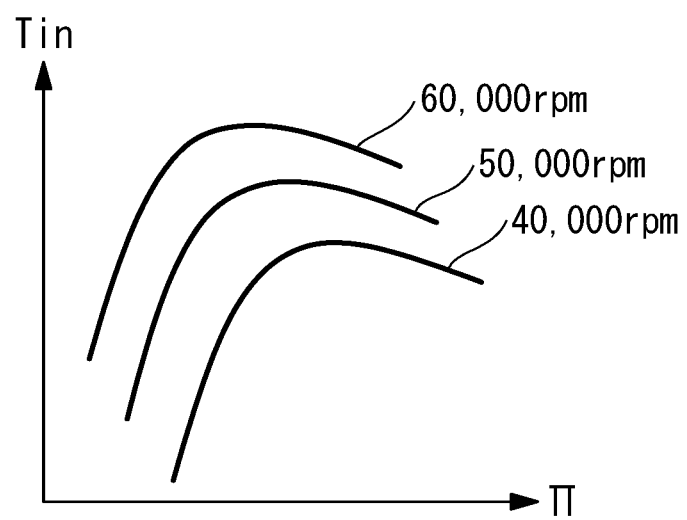
FIG. 5 is a map showing a relationship among an inlet temperature, a pressure ratio, and a rotational speed in the control unit according to the second embodiment of the present invention.

The relationship among the inlet temperature Tin of the exhaust in the turbine generator 6, the pressure ratio Π of the exhaust in the turbine generator 6, and the rotational speed Nt at which efficiency is substantially maximized in the turbine generator 6 is, for example, a map as shown in FIG. 5. Specifically, in the map shown in FIG. 5, in a case where the horizontal axis represents the pressure ratio Π, the vertical axis represents the inlet temperature Tin, and the inlet temperature Tin and pressure ratio Π are respective certain values, the rotational speed Nt at which the efficiency of the turbine generator 6 is substantially maximized is shown in an isoline-diagram method (contour diagram). The map in FIG. 5 shows, as an example, iso-lines where the rotational frequencies Nt are 60,000 rpm, 50,000 rpm, and 40,000 rpm. That is, by using the map as shown in FIG. 5, it is possible to calculate the rotational speed Nt at which efficiency is substantially maximized in the turbine generator 6 from the inlet temperature Tin and pressure ratio Π.

The map (relationship) as shown in FIG. 5 is created in advance by a preliminary test using a turbine generator 6 having the same configuration as that of the turbine generator 6 applied to the supercharging system 1, analysis using past data, or the like. Regarding the relationship among the inlet temperature Tin, pressure ratio Π, and rotational speed Nt at which efficiency is substantially maximized in the turbine generator 6, a method is not limited to the map as shown in FIG. 5, and a method, such as a table or a mathematical formula, capable of uniquely determining the rotational speed Nt from the inlet temperature Tin and pressure ratio Π can be applied as appropriate.

A voltage change amount control unit 32 controls a change amount of a DC voltage in a converter unit 12 on the basis of the target rotational speed Nt* set by the target value setting unit 31' so that a present rotational speed Nt of the turbine generator 6 matches the target rotational speed Nt*.

That is, in the embodiment, in the setting of the target rotational speed Nt* in the target value setting unit 31', since the rotational speed Nt of the turbine generator 6 at which efficiency is substantially maximized can be identified from the inlet temperature Tin and pressure ratio Π of the exhaust in the turbine generator 6 without depending on a peripheral velocity ratio, it is possible to efficiently operate the turbine generator 6 even if the peripheral velocity ratio at which the efficiency of the turbine generator 6 is maximized is not constant.

As described above, according to the supercharging system according to the embodiment, by using the relationship among the inlet temperature Tin and pressure ratio Π of the exhaust in the turbine generator 6 and the rotational speed Nt at which efficiency is substantially maximized in the turbine generator 6, it is possible to easily acquire the rotational speed Nt at which efficiency is substantially maximized from the present inlet temperature Tin and pressure ratio Π of the turbine generator 6. That is, it is possible to more simply set the target rotational speed Nt*.

Since the peripheral velocity ratio U/CO (for example, 0.7) at which the efficiency of the turbine generator 6 becomes better is not necessarily constant, by directly acquiring the rotational speed Nt at which efficiency is substantially maximized from the inlet temperature Tin and pressure ratio Π of the exhaust in the turbine generator 6, it is possible to more accurately make the turbine generator 6 in a highly efficient state.

Third Embodiment

Next, a supercharging system according to a third embodiment of the present invention will be described.

In the above-described first embodiment and second embodiment, the target value setting unit 31 (or target value setting unit 31') sets the target rotational speed Nt* on the basis of the inlet temperature Tin of the exhaust in the turbine generator 6 and the pressure ratio Π of the exhaust in the turbine generator 6. However, in the first embodiment and second embodiment, measuring instruments that measure the inlet temperature Tin of the exhaust in the turbine generator 6 and the pressure ratio Π of the exhaust in the turbine generator 6 become necessary. Therefore, in the embodiment, without providing the measuring instruments that measure the inlet temperature Tin and pressure ratio Π of the exhaust in the turbine generator 6, the rotational speed Nt at which the efficiency of the turbine generator 6 is substantially maximized is set as the target rotational speed Nt*. Hereinafter, a supercharging system 1 according to the embodiment will be described focusing on differences from the first embodiment and second embodiment.

In the embodiment, it is assumed that measuring instruments that measure a rotational speed Ne and a load state P of an engine 4 are provided for the engine 4. The measuring instruments that measure the rotational speed Ne and load state P of the engine 4 are generally used for control of the engine 4 and therefore provided independently of the control by the control unit 15. That is, in the embodiment, without providing new measuring instruments (for example, the measuring instrument of the inlet temperature Tin of the turbine generator 6), but by using existing measuring instruments (measuring instruments that measure the rotational speed Ne and load state P of the engine 4), rotational speed Nt control of the turbine generator 6 is implemented. For this reason, it is preferable that the supercharging system 1 of the embodiment is applied to a case where the measuring instruments that measure the rotational speed Ne and load state P of the engine 4 are provided already.

The rotational speed Ne of the engine 4 is a rotational speed when energy extracted by burning high-temperature high-pressure air that has been pumped is converted into a rotational movement (for example, a rotational speed when a reciprocating movement of a piston due to combustion is converted into a rotational movement by a flywheel or the like). The load state P of the engine 4 means a torque of the engine 4 or an output calculated from the torque and rotational speed of the engine 4.

Figure 6:
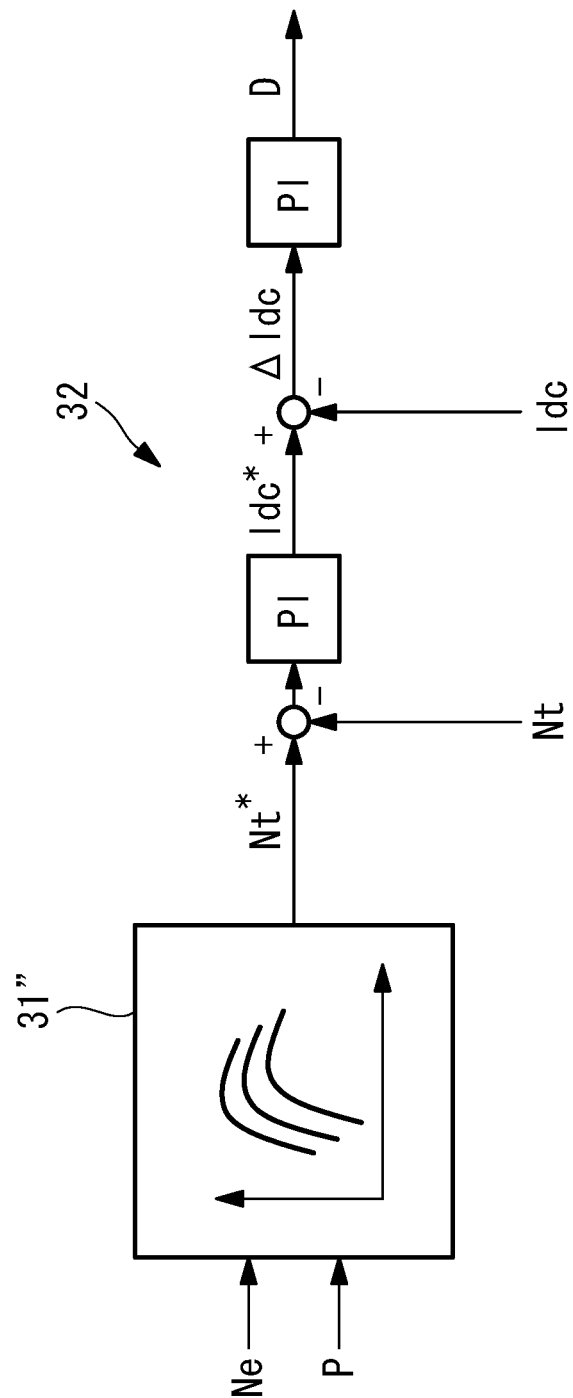
FIG. 6 is a control block diagram of a control unit according to a third embodiment of the present invention.

FIG. 6 is a control block diagram of the control unit 15 according to the embodiment. A target value setting unit 31" in the embodiment has a relationship between an operating state of the engine 4 and a rotational speed Nt at which efficiency is substantially maximized in the turbine generator 6, identifies a rotational speed Nt at which efficiency is substantially maximized from a present operating state of the engine 4 on the basis of the relationship, and sets the identified rotational speed Nt as the target rotational speed Nt*. In the embodiment, the operating state of the engine 4 will be described using the rotational speed Ne and load state P of the engine 4 but other parameters may be used. Since the rotational speed Ne and load state P of the engine 4 have a correlation with the inlet temperature Tin and pressure ratio Π of the exhaust in the turbine generator 6, by using the rotational speed Ne and load state P of the engine 4, it is possible to easily grasp the inlet temperature Tin and pressure ratio Π of the exhaust in the turbine generator 6, that is, the operating state (state of efficiency) of the turbine generator 6.

Figure 7:
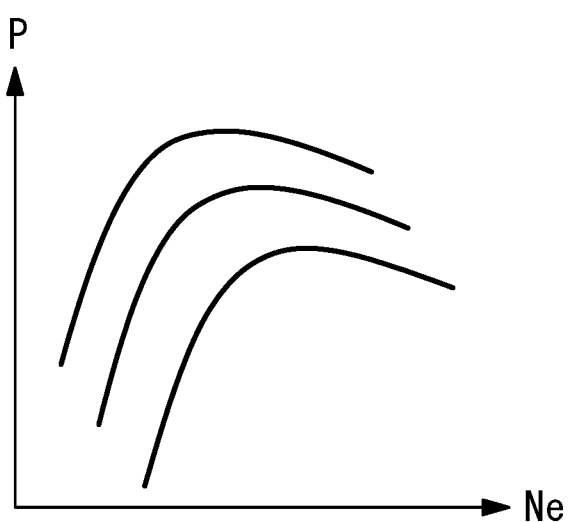
FIG. 7 is a map showing a relationship between an operating state and a rotational speed of an engine in the control unit according to the third embodiment of the present invention.

The relationship between the operating state of the engine 4 and the rotational speed Nt at which efficiency is substantially maximized in the turbine generator 6 is, for example, a map as shown in FIG. 7. Specifically, in the map shown in FIG. 7, in a case where the horizontal axis represents the rotational speed Ne of the engine 4, the vertical axis represents the load state P of the engine 4, and the rotational speed Ne and load state P are respective certain values, the rotational speed Nt at which the efficiency of the turbine generator 6 is substantially maximized is shown in an isoline-diagram method (contour diagram). That is, on the basis of the map as shown in FIG. 7, it is possible to calculate the rotational speed Nt at which efficiency is substantially maximized in the turbine generator 6 from the rotational speed Ne of the engine 4 and the load state P of the engine 4.

The map (relationship) as shown in FIG. 7 is created in advance by a preliminary test using a turbine generator 6 having the same configuration as that of the turbine generator 6 applied to the supercharging system 1, analysis using past data, or the like. Regarding the relationship among the rotational speed Ne of the engine 4, load state P, and rotational speed Nt at which efficiency is substantially maximized in the turbine generator 6, a method is not limited to the map as shown in FIG. 7, and a method, such as a table or a mathematical formula, capable of uniquely determining the rotational speed Nt from the rotational speed Ne and load state P of the engine 4 can be applied as appropriate.

A voltage change amount control unit 32 controls a change amount of an input voltage Vin in a converter unit 12 on the basis of the target rotational speed Nt* set by the target value setting unit 31" so that a present rotational speed Nt of the turbine generator 6 matches the target rotational speed Nt*.

As described above, according to the supercharging system according to the embodiment, by using the relationship between the operating state of the engine 4 and the rotational speed Nt at which efficiency is substantially maximized in the turbine generator 6, it is possible to easily acquire the rotational speed Nt of the turbine generator 6 at which efficiency is substantially maximized. Since the rotational speed Ne and load state P of the engine 4 are used as the operating state, it is possible to efficiently identify the operating state of the engine 4.

Fourth Embodiment

Next, a supercharging system according to a fourth embodiment of the present invention will be described.

In the above-described first embodiment, the change amount of the DC voltage in the converter unit 12 is controlled so that the rotational speed Nt of the turbine generator 6 matches the target rotational speed Nt*, whereas in this embodiment, an optimal state quantity of a supercharging system 1 in the future is calculated and based on the optimal state quantity, a change amount of a DC voltage in a converter unit 12 is controlled. Hereinafter, the supercharging system 1 according to the embodiment will be described focusing on differences from the first embodiment, second embodiment, and third embodiment.

Figure 8:
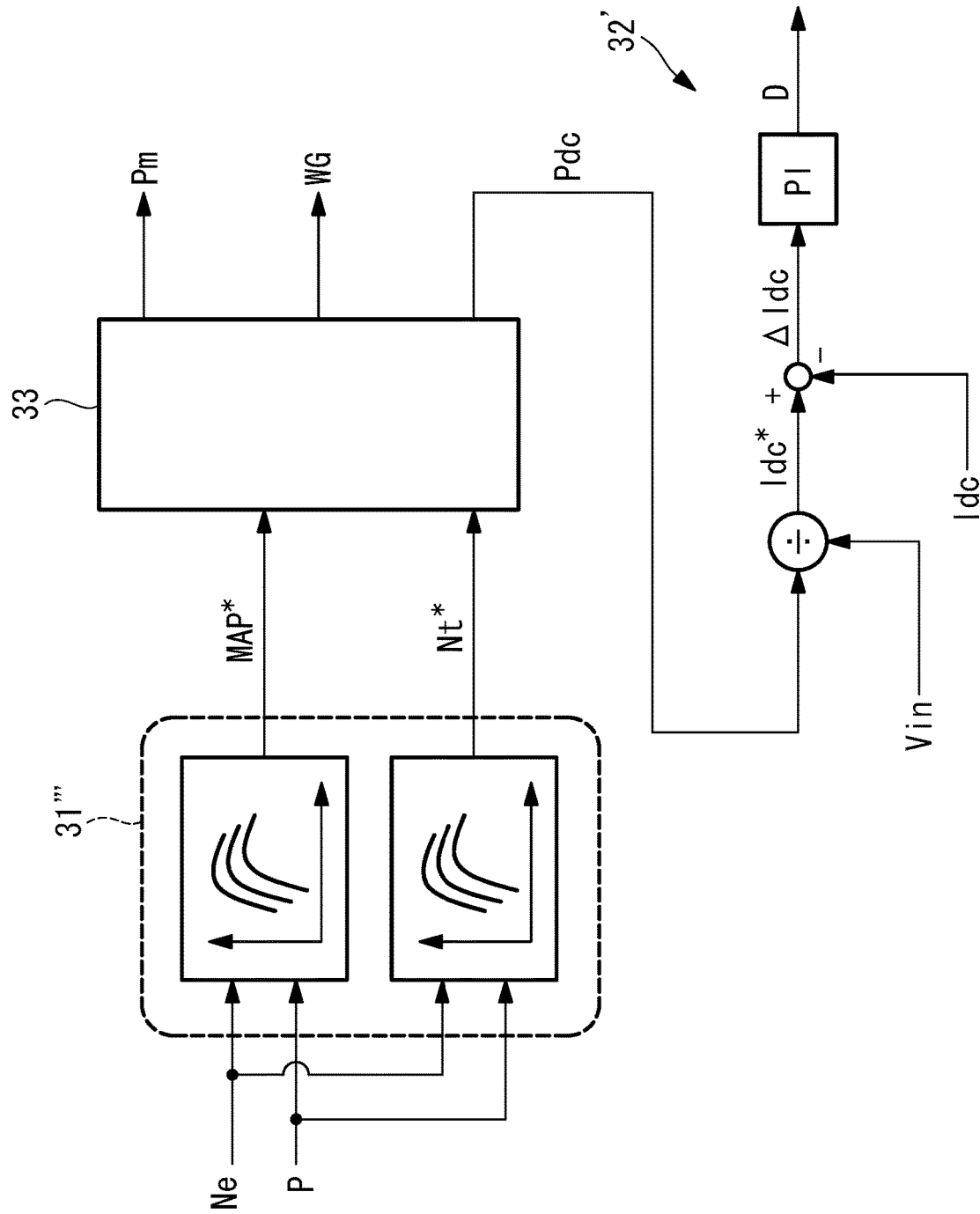
FIG. 8 is a control block diagram of a control unit according to a fourth embodiment of the present invention.

A control unit 15 according to the embodiment calculates an optimal state quantity of a predetermined state quantity (control input or the like) of the supercharging system 1 in the future after a predetermined time has elapsed, and controls the change amount of the DC voltage in the converter unit 12 on the basis of the calculated optimal state quantity. Conceptually, the control unit 15 predicts a state quantity (optimal state quantity) when the operating state of the supercharging system 1 in the future after the predetermined time has elapsed is estimated to be optimal on the basis of a predetermined evaluation function, and controls the supercharging system 1 (converter unit 12 or the like) in advance so as to be the predicted optimal state quantity. In particular, the control unit 15 controls the change amount of the DC voltage in the converter unit 12 in advance. FIG. 8 is a control block diagram of the control unit 15 according to the embodiment. As shown in FIG. 8, the control unit 15 includes a target value setting unit 31''', a model analysis unit 33, and a voltage change amount control unit 32'.

The target value setting unit 31''' sets a target value of the state quantity indicating the operating state of the supercharging system 1 as a target state quantity. Specifically, the target value setting unit 31''' sets a target rotational speed Nt* of a turbine generator 6 and a target value MAP* of an intake manifold pressure MAP as target state quantities. The intake manifold pressure MAP is a pressure of intake air in a cylinder (intake manifold) on an intake side of the engine 4. In the embodiment, a case will be described where the target rotational speed Nt* of the turbine generator 6 and the intake manifold pressure target value MAP* are used, but other parameters can be used.

The target value setting unit 31''' sets the target rotational speed Nt* of the turbine generator 6. Regarding a specific setting method, the setting methods described in the above-described first embodiment (target value setting unit 31), second embodiment (target value setting unit 31'), and third embodiment (target value setting unit 31'') can be used. In the embodiment, it is assumed that the target value setting unit 31''' uses the setting method described in the third embodiment.

The target value setting unit 31''' sets the intake manifold pressure target value MAP*. The target value setting unit 31''' has a relationship between an operating state of the engine 4 (rotational speed Ne and load state P of the engine 4) and an intake manifold pressure MAP at which fuel efficiency of the engine 4 is substantially maximized (fuel consumption is substantially minimized), identifies an intake manifold pressure MAP at which the fuel efficiency of the engine 4 is substantially maximized (fuel consumption is substantially minimized) from a present operating state of the engine 4 on the basis of the relationship, and sets the identified intake manifold pressure MAP as the intake manifold pressure target value MAP*. The target value setting unit 31''' may calculate the intake manifold pressure target value MAP* from parameters other than the operating state of the engine 4 (rotational speed Ne and load state P of the engine 4).

The model analysis unit 33 uses a predetermined evaluation function including a difference between the state quantity of the supercharging system 1 and the target state quantity as a variable, and calculates an optimal state quantity of the supercharging system 1 at which a solution of the evaluation function is substantially minimized after the elapse of the predetermined time on the basis of an analysis model of the supercharging system 1. The model analysis unit 33 includes the analysis model for predicting a future state quantity in the supercharging system 1, and includes the predetermined evaluation function (objective function) for evaluating a future state of the supercharging system 1. The model analysis unit 33 uses the analysis model and evaluation function to predict the optimal state quantity (control input or the like) at which the supercharging system 1 is at an optimal operation point in the future after the elapse of the predetermined time in advance.

The analysis model is a model capable of predicting a future state of a specific parameter in the supercharging system 1 and, for example, the analysis model is a differential equation with respect to a state quantity x of a system as shown in a formula (3). By describing the model as a differential equation, a change (behavior) of the state quantity x can be easily predicted.

[Expression 2]

$$\dot{x} = f(x, u, d) \quad (3)$$

In the formula (3), x denotes a state quantity (in the embodiment, the rotational speed Nt of the turbine generator 6 and the intake manifold pressure MAP) of a change prediction target, u denotes a state quantity (control input or the like) of a calculation object in the model analysis unit 33, and d denotes disturbance. The parameters included in a function f in the formula (3) are examples and different depending on differential equations of the state quantity x of the prediction object.

Specifically, in a case where the state quantity x of the system is the rotational speed Nt of the turbine generator 6, the differential equation in the formula (3) is represented by a formula (4).

[Expression 3]

$$J_t \frac{dN_t}{dt} = \frac{P_t - P_g}{N_t} \quad (4)$$

In the formula (4), Jt denotes inertia of the turbine generator 6, Pt denotes motivity (energy) of a turbine 6a generated by supplied exhaust, and Pg denotes a load on a generator 6b (power which the generator 6b is requested to generate). The motivity Pt of the turbine 6a is represented by, for example, a formula (5).

[Expression 4]

$$P_t = \eta_t C_p T_{in} w_t \left(1 - \Pi^{\frac{\kappa-1}{\kappa}}\right) \quad (5)$$

In the formula (5), ηt denotes efficiency of the turbine 6a, Cp denotes a constant pressure heat capacity of the turbine 6a, wt denotes a mass flow rate of the turbine 6a, and κ denotes a specific heat ratio. The load Pg on the generator 6b is represented by, for example, a formula (6).

[Expression 5]

$$P_g = \frac{P_{dc}}{\eta_g \eta_{rec}} \qquad (6)$$

In the formula (6), Pdc denotes an input power of the converter unit 12 (product of an input voltage Vin and a DC current Idc), ηg denotes efficiency of the generator 6b, and ηrec denotes efficiency of a rectifying unit 11.

For other state quantities (intake manifold pressure MAP), it is assumed that their models of differential equations are stored in the model analysis unit 33.

The evaluation function includes a difference (tracking error) between the state quantity of the supercharging system 1 and the target state quantity as a variable, and is defined as, for example, a formula (7). The model analysis unit 33 predicts a future value of the state quantity x by using the analysis model and calculates a value of the state quantity u estimated to be optimal in the future by using the evaluation function.

[Expression 6]

$$g(x,u) = \int (\|x-x^*\|_Q^2 + \|\dot{u}\|_R^2) dt \qquad (7)$$

In the formula (7), x* denotes a target value of the state quantity x. Q denotes weighting added in the tracking error (absolute value of (x−x*)) with respect to the target value. As Q becomes larger, responsiveness improves. R denotes weighting for a change amount of u. The weighting is, for example, multiplying by a constant, and to control responsiveness or the like by adjusting magnitude of each parameter in the evaluation function.

A specific example in the formula (7) in which the state quantity x is the rotational speed Nt of the turbine generator 6 and the intake manifold pressure MAP is shown in a formula (8).

[Expression 7]

$$g(x, u) = \int \left( \left\| \begin{matrix} N_t - N_t^* \\ MAP - MAP^* \end{matrix} \right\|_Q^2 + \left\| \begin{matrix} \dot{P}_m \\ \dot{P}_{dc} \\ \dot{W}G \end{matrix} \right\|_R^2 \right) dt \qquad (8)$$

In the formula (8), Pm denotes an input power of an electric motor 2b and WG denotes the degree of opening of a waste gate. The waste gate is a valve provided on a bypass path (not shown) that directly discharges the exhaust of the engine 4 into outside air, and is for adjusting a back pressure of the engine 4. The input power Pm of the electric motor 2b, the input power Pdc of the converter unit 12, and the degree of opening WG of the waste gate are parameters calculated as future optimal state quantities. The parameters calculated as optimal state quantities can be changed as appropriate.

That is, the model analysis unit 33 predicts the rotational speed Nt of the turbine generator 6 which is a state quantity in the future after the elapse of the predetermined time by the differential equation of the formula (5) (also predicts the intake manifold pressure MAP by using a differential equation in the same manner) and calculates optimal state quantities (Pm, Pdc, and WG) that make a solution of the evaluation function of the formula (8) substantially minimum in the future after the elapse of the predetermined time.

As shown in the formula (6), since the load Pg on the generator 6b is a function of the input power Pdc of the converter unit 12, the rotational speed Nt of the turbine generator 6 in the formula (4) becomes a function (Nt(Pdc)) of the input power Pdc of the converter unit 12. That is, in order to predict the state quantities (Nt and MAP), the state quantities (Pm, Pdc, and WG) of a calculation object are also considered, so in the formula (8), the tracking errors (absolute value of (Nt−Nt*) and absolute value of (MAP−MAP*)) also depend on the state quantities (Pm, Pdc, and WG).

That is, by using the evaluation function like the formula (8), while taking the situation of the entire supercharging system 1 into consideration more, it is possible to calculate the state quantities (Pm, Pdc, and WG) by which the state quantities (Nt and MAP) more closely approaches the target values (Nt* and MAP*) in the future after the elapse of the predetermined time. The calculated state quantities (Pm, Pdc, and WG) are used for each control as the future optimal state quantities. For example, the input power Pdc of the converter unit 12 which is the future optimal state quantity calculated by the formula (8) is output to the voltage change amount control unit 32' and used for control of the change amount of the DC voltage in the converter unit 12.

The voltage change amount control unit 32' controls the change amount of the DC voltage in the converter unit 12 on the basis of the optimal state quantity calculated by the model analysis unit 33. Specifically, the voltage change amount control unit 32' acquires Pdc which is the optimal state quantity calculated by the model analysis unit 33 as shown in FIG. 8. The voltage change amount control unit 32' then divides Pdc by a measurement value of an input voltage Vin of the converter unit 12 and thereby calculates a target DC current Idc*. Then, the voltage change amount control unit 32' acquires a present DC current Idc (measurement value) from a current measuring instrument, calculates a difference ΔIdc, and calculates a duty ratio D of a switching element 24 for making the difference ΔIdc zero. A switching control signal of the calculated duty ratio D is input into a control terminal (gate) of the switching element 24 in the converter unit 12, and on/off of the switching element 24 is controlled according to the duty ratio D.

In this way, since the switching element 24 in the converter unit 12 is controlled on the basis of the optimal state quantity in the future after the elapse of the predetermined time, it is possible to adjust the operating state of the turbine generator 6 in advance. For this reason, it is possible to control the supercharging system 1 in advance even during a period when the operating state such as a transient state is likely to vary.

The evaluation function in the model analysis unit 33 is not limited to the formula (8) and other formulas can be applied. For example, assuming that the rotational speed of the low pressure compressor 2 is Nec, a formula (9) may be used as an evaluation function. A formula (10) may be used as an evaluation function by using the input power Pm of the electric motor 2b.

[Expression 8]

$$g(x, u) = \int \left( \left\| \begin{matrix} N_t - N_t^* \\ MAP - MAP^* \\ N_{EC} \end{matrix} \right\|_Q^2 + \left\| \begin{matrix} \dot{P}_m \\ \dot{P}_{dc} \\ \dot{W}G \end{matrix} \right\|_R^2 \right) dt \qquad (9)$$

-continued $$g(x, u) = \int \left( \left\| \begin{matrix} N_t - N_t^* \\ MAP - MAP^* \\ P_m \end{matrix} \right\|_Q^2 + \left\| \begin{matrix} \dot{P}_m \\ \dot{P}_{dc} \\ \dot{W}G \end{matrix} \right\|_R^2 \right) dt \quad (10)$$

As described above, according to the supercharging system according to the embodiment, since a function including the difference between the state quantity of the supercharging system 1 and the target state quantity as a variable is adopted as the evaluation function, and the optimal state quantity of the supercharging system 1 at which a solution of the evaluation function is substantially minimized after the elapse of the predetermined time is calculated, it is possible to calculate an optimal state quantity of the supercharging system 1 in the future. Since the change amount of the DC voltage in the converter unit 12 is then controlled on the basis of the optimal state quantity, it is possible to efficiently make the supercharging system 1 the optimal operating state in advance. That is, even when the operating state of the supercharging system 1 is transient, the operating state can be optimized more effectively.

Since the evaluation function includes the difference between the rotational speed Nt and target rotational speed Nt* in the turbine generator 6 as a variable, it is possible to set the evaluation function by using an easily obtainable parameter (rotational speed Nt).

The present invention is not limited to the above-described embodiments only, and various modifications can be made without departing from the scope of the present invention. The embodiments can also be combined.

INDUSTRIAL APPLICABILITY

The supercharging system of the present invention can be used for, for example, automobiles. In addition, the supercharging system can be used for objects equipped with engines without being limited to automobiles.

REFERENCE SIGNS LIST

1 Supercharging system
2 Low pressure compressor
2a Compressor
2b Electric motor
3 High pressure compressor
4 Engine
5 Exhaust turbine
6 Turbine generator
6a Turbine
6b Generator
7 Drive device
11 Rectifying unit
12 Converter unit
13 Power storage unit
14 Inverter unit
15 Control unit
21 DC line
22 Ground line
23 Capacitor
24 Switching element
25 Inductor
26 Backflow prevention element
27 Capacitor
31, 31', 31", 31''' Target value setting unit
32, 32' Voltage change amount control unit
33 Model analysis unit

The invention claimed is:

1. A supercharging system, comprising:
a compressor driven by an electric motor to pump fluid to an internal combustion engine;
a turbine generator rotated by exhaust from the internal combustion engine; and
a drive device that drives the electric motor by electricity generated by the turbine generator,
wherein the drive device comprises:
   a rectifying unit that rectifies the electricity generated by the turbine generator;
   a converter unit that steps up or down a voltage value of a DC voltage rectified by the rectifying unit and outputs the DC voltage;
   an inverter unit that drives the electric motor using the DC voltage output from the converter unit; and
   a control unit that controls a change amount of stepping up/down of the DC voltage in the converter unit,
wherein the control unit comprises:
   a target value setting unit that sets a target value of a state quantity indicating an operation state of the supercharging system as a target state quantity;
   a model analysis unit that uses a predetermined evaluation function including a difference between a state quantity of the supercharging system and the target state quantity as a variable, and calculates an optimal state quantity of the supercharging system at which a solution to the evaluation function is substantially minimized after a predetermined time has elapsed based on an analysis model of the supercharging system; and
   a voltage change amount control unit that controls the change amount of the DC voltage in the converter unit based on the optimal state quantity calculated by the model analysis unit, and
wherein the model analysis unit predicts a rotational speed $N_t$ of the turbine generator and an intake manifold pressure MAP, which is a state quantity at a future time after the elapse of the predetermined time, by a differential equation of $$P_t = \eta_t C_p T_{in} w_t \left(1 - \Pi^{-\frac{k-1}{k}}\right)$$

and calculates optimal state quantities $P_m$, $P_{dc}$ and WG that make a solution of an evaluation function of $$g(x, u) = \int \left( \left\| \begin{matrix} N_t - N_t^* \\ MAP - MAP^* \end{matrix} \right\|_Q^2 + \left\| \begin{matrix} \dot{P}_m \\ \dot{P}_{dc} \\ \dot{W}G \end{matrix} \right\|_R^2 \right) dt$$

substantially minimum at the future time after the elapse of the predetermined time,
where $P_t$ is a motivity of a turbine of the turbine generator, $\eta_t$ is an efficiency of the turbine, $C_p$ is a constant pressure heat capacity of the turbine, $w_t$ is a mass flow rate of the turbine, k is a specific heat ratio, $N_t^*$ is a target rotational speed, MAP* is a target intake manifold pressure, Q is weighting added in a tracking error with respect to the target value, $P_m$ is an input power of the electric motor, $P_{dc}$ is an input power of the converter unit, WG is a degree of opening of a waste gate, R is weighting for a change amount of u, and u is an outer peripheral velocity of turbine blades.

2. The supercharging system according to claim 1, wherein the change amount of stepping up/down is a change amount of stepping up/down between an input voltage Vin and a converter unit output voltage Vout.

3. The supercharging system according to claim 1, wherein the drive device comprises a battery that stores the DC voltage output from the converter unit.

4. The supercharging system according to claim 1, wherein
the target value setting unit sets a target rotational frequency of the turbine generator as the target state quantity, and
wherein the voltage change amount control unit controls the change amount of the DC voltage in the converter unit so that a present rotational frequency of the turbine generator matches the target rotational frequency.

5. The supercharging system according to claim 1, wherein:
the target value setting unit sets a target rotational frequency of the turbine generator as the target state quantity; and
the model analysis unit uses a difference between a rotational frequency of the turbine generator and the target rotational frequency as the variable in the evaluation function.

6. The supercharging system according to claim 4, wherein the target value setting unit sets the target rotational frequency at which a peripheral velocity ratio, which is a ratio of an outer peripheral velocity of the turbine to a flow velocity of fluid flowing into the turbine in the turbine generator, reaches a predetermined value.

7. The supercharging system according to claim 6, wherein the target value setting unit sets the target rotational frequency at which the peripheral velocity ratio reaches the predetermined value based on an inlet temperature of the exhaust in the turbine generator and a pressure ratio of the exhaust in the turbine generator.

8. The supercharging system according to claim 4, wherein the target value setting unit has a relationship among an inlet temperature of the exhaust in the turbine generator, a pressure ratio of the exhaust in the turbine generator, and a rotational frequency at which efficiency is substantially maximized in the turbine generator, identifies a rotational frequency at which efficiency is substantially maximized from the inlet temperature and the pressure ratio at present of the turbine generator based on the relationship, and sets the identified rotational frequency as the target rotational frequency.

9. The supercharging system according to claim 4, wherein the target value setting unit has a relationship between an operating state of the internal combustion engine and a rotational frequency at which efficiency is substantially maximized in the turbine generator, identifies a rotational frequency at which efficiency is substantially maximized from a present operating state of the internal combustion engine based on the relationship, and sets the identified rotational frequency as the target rotational frequency.

10. The supercharging system according to claim 9, wherein the operating state is a rotational frequency and a load state of the internal combustion engine.

11. The supercharging system according to claim 2, wherein the drive device comprises a battery that stores the DC voltage output from the converter unit.

12. The supercharging system according to claim 2, wherein
the target value setting unit sets a target rotational frequency of the turbine generator as the target state quantity, and
wherein the voltage change amount control unit controls the change amount of the DC voltage in the converter unit so that a present rotational frequency of the turbine generator matches the target rotational frequency.

13. The supercharging system according to claim 2, wherein:
the target value setting unit sets a target rotational frequency of the turbine generator as the target state quantity; and
the model analysis unit uses a difference between a rotational frequency of the turbine generator and the target rotational frequency as the variable in the evaluation function.

14. The supercharging system according to claim 12, wherein the target value setting unit sets the target rotational frequency at which a peripheral velocity ratio, which is a ratio of an outer peripheral velocity of the turbine to a flow velocity of fluid flowing into the turbine in the turbine generator, reaches a predetermined value.

15. The supercharging system according to claim 14, wherein the target value setting unit sets the target rotational frequency at which the peripheral velocity ratio reaches the predetermined value based on an inlet temperature of the exhaust in the turbine generator and a pressure ratio of the exhaust in the turbine generator.

16. The supercharging system according to claim 12, wherein the target value setting unit has a relationship among an inlet temperature of the exhaust in the turbine generator, a pressure ratio of the exhaust in the turbine generator, and a rotational frequency at which efficiency is substantially maximized in the turbine generator, identifies a rotational frequency at which efficiency is substantially maximized from the inlet temperature and the pressure ratio at present of the turbine generator based on the relationship, and sets the identified rotational frequency as the target rotational frequency.

17. The supercharging system according to claim 12, wherein the target value setting unit has a relationship between an operating state of the internal combustion engine and a rotational frequency at which efficiency is substantially maximized in the turbine generator, identifies a rotational frequency at which efficiency is substantially maximized from a present operating state of the internal combustion engine based on the relationship, and sets the identified rotational frequency as the target rotational frequency.

18. The supercharging system according to claim 17, wherein the operating state is a rotational frequency and a load state of the internal combustion engine.

* * * * *